United States Patent
Kosarev

(10) Patent No.: US 11,115,975 B2
(45) Date of Patent: Sep. 7, 2021

(54) METHOD FOR WIRELESS COMMUNICATION BETWEEN SUBSCRIBERS AND BASE STATIONS

(71) Applicant: Obshchestvo s ogranichennoy otvetstvennostyu "RadioTekh", Moscow (RU)

(72) Inventor: Sergey Alexandrovich Kosarev, Moscow (RU)

(73) Assignee: Obshchestvo s ogranichennoy otvetstvennostyu "RadioTekh", Moscow (RU)

( * ) Notice: Subject to any disclaimer, the term of this patent is extended or adjusted under 35 U.S.C. 154(b) by 0 days.

(21) Appl. No.: 16/976,116

(22) PCT Filed: Feb. 21, 2019

(86) PCT No.: PCT/RU2019/000109
§ 371 (c)(1),
(2) Date: Aug. 27, 2020

(87) PCT Pub. No.: WO2019/168439
PCT Pub. Date: Sep. 6, 2019

(65) Prior Publication Data
US 2020/0413387 A1 Dec. 31, 2020

(30) Foreign Application Priority Data

Mar. 1, 2018 (RU) .......................... RU2018107611

(51) Int. Cl.
*H04W 72/04* (2009.01)
*H04B 1/7097* (2011.01)
(Continued)

(52) U.S. Cl.
CPC ........ *H04W 72/044* (2013.01); *H04B 1/7097* (2013.01); *H04B 1/715* (2013.01); *H04W 72/005* (2013.01); *H04B 2201/698* (2013.01)

(58) Field of Classification Search
CPC .............. H04W 72/044; H04W 72/005; H04B 1/7097; H04B 1/715; H04B 2201/698
See application file for complete search history.

(56) References Cited

U.S. PATENT DOCUMENTS

| 5,515,369 A | * | 5/1996 | Flammer, III | ....... H04B 1/7143 370/480 |
| 5,953,371 A | * | 9/1999 | Rowsell | .................. H04B 1/667 375/220 |

(Continued)

FOREIGN PATENT DOCUMENTS

| RU | 2218667 C2 | 12/2003 |
| RU | 2556463 C2 | 7/2015 |

(Continued)

OTHER PUBLICATIONS

International Search Report in PCT/RU2019/000109, dated Jun. 20, 2019.

*Primary Examiner* — James M Perez
(74) *Attorney, Agent, or Firm* — Collard & Roe, P.C.

(57) ABSTRACT

In a wireless communication method, base stations having an identical number of channels for receiving narrowband modulation (UNB) are divided into groups. Data transmission channels of all base stations have identical time and frequency characteristics. All subscribers split into groups are periodically sent messages with subscriber group numbers by all the base stations. When a group number of a corresponding subscriber coincides with a group number in a message received by the subscriber, all the subscribers of the group send response messages to the base stations using UNB, wherein response messages are sent sequentially from (Continued)

all subgroups of subscribers of the group, and subscribers of a subgroup send response messages on different frequencies. The base stations receive the response messages on all frequencies corresponding to subscribers, decode the messages and generate a database of response messages, which can be used for generating subsequent messages with corresponding subscriber group numbers.

19 Claims, 9 Drawing Sheets

(51) Int. Cl.
*H04B 1/715* (2011.01)
*H04W 72/00* (2009.01)

(56) References Cited

U.S. PATENT DOCUMENTS

| | | | | |
|---|---|---|---|---|
| 8,228,188 | B2* | 7/2012 | Key | G16H 40/67 |
| | | | | 340/539.12 |
| 8,437,782 | B2* | 5/2013 | Bergqvist | H04W 68/02 |
| | | | | 455/458 |
| 8,837,652 | B2* | 9/2014 | Stern | H04L 27/2613 |
| | | | | 375/350 |
| 9,467,718 | B1* | 10/2016 | Newell | H04N 21/2743 |
| 9,525,454 | B2* | 12/2016 | Seller | H04B 1/69 |
| 9,647,718 | B2* | 5/2017 | Seller | H04B 1/692 |
| 9,800,288 | B2* | 10/2017 | Seller | G01S 5/10 |
| 10,009,956 | B1* | 6/2018 | Feher | H04L 27/2649 |
| 10,148,313 | B2* | 12/2018 | Seller | G01S 5/14 |
| 10,200,232 | B1* | 2/2019 | Wentzloff | H04L 5/22 |
| 2006/0072647 | A1* | 4/2006 | Feher | H04L 25/4902 |
| | | | | 375/130 |
| 2011/0003610 | A1* | 1/2011 | Key | G16H 40/67 |
| | | | | 455/509 |
| 2014/0219325 | A1* | 8/2014 | Artigue | H04L 25/022 |
| | | | | 375/226 |
| 2014/0321406 | A1* | 10/2014 | Marinier | H04W 72/0413 |
| | | | | 370/329 |
| 2015/0123786 | A1* | 5/2015 | Hasan | A61B 5/0205 |
| | | | | 340/539.12 |
| 2016/0094269 | A1* | 3/2016 | Seller | H04B 1/692 |
| | | | | 375/139 |
| 2016/0261306 | A1* | 9/2016 | Seller | G01S 5/0246 |
| 2016/0330069 | A1* | 11/2016 | Nordmark | G08B 29/08 |
| 2017/0222847 | A1* | 8/2017 | Feher | H04L 27/0008 |
| 2017/0324441 | A1* | 11/2017 | Seller | G01S 5/021 |
| 2018/0132087 | A1* | 5/2018 | Fourtet | H04L 27/368 |
| 2018/0283615 | A1* | 10/2018 | Bernard | H04Q 9/00 |
| 2018/0329073 | A1* | 11/2018 | Antonov | G01S 19/36 |
| 2019/0253101 | A1* | 8/2019 | Kilian | H04L 67/12 |
| 2020/0007186 | A1* | 1/2020 | Seller | H04B 1/7136 |
| 2020/0007187 | A1* | 1/2020 | Seller | H04B 1/715 |
| 2020/0007188 | A1* | 1/2020 | Ning | H04W 74/085 |
| 2020/0025860 | A1* | 1/2020 | Ivanov | G01S 5/0252 |
| 2020/0033438 | A1* | 1/2020 | Isson | G01S 5/0252 |
| 2020/0053662 | A1* | 2/2020 | Yang | H04M 1/72412 |
| 2020/0053724 | A1* | 2/2020 | MolavianJazi | H04W 72/10 |
| 2020/0053832 | A1* | 2/2020 | Yang | H04W 88/10 |
| 2020/0059686 | A1* | 2/2020 | Yang | H04M 1/72412 |
| 2020/0106755 | A1* | 4/2020 | Gulbay | H04N 21/25875 |
| 2020/0177233 | A1* | 6/2020 | Kneissl | H04B 1/7156 |
| 2020/0227829 | A1* | 7/2020 | Jouanlanne | H01Q 5/335 |
| 2020/0288313 | A1* | 9/2020 | Kunz | H04W 12/06 |
| 2020/0305174 | A1* | 9/2020 | Ganesan | H04W 84/20 |
| 2020/0336241 | A1* | 10/2020 | Kilian | H04L 1/0003 |
| 2021/0022102 | A1* | 1/2021 | Wirola | H04W 64/00 |
| 2021/0068102 | A1* | 3/2021 | Marinier | H04W 52/146 |
| 2021/0153033 | A1* | 5/2021 | Peleg | H04B 7/15507 |

FOREIGN PATENT DOCUMENTS

| | | |
|---|---|---|
| RU | 2620369 C1 | 5/2017 |
| WO | 2009/109779 A1 | 9/2009 |
| WO | 2013/049769 A1 | 4/2013 |

* cited by examiner

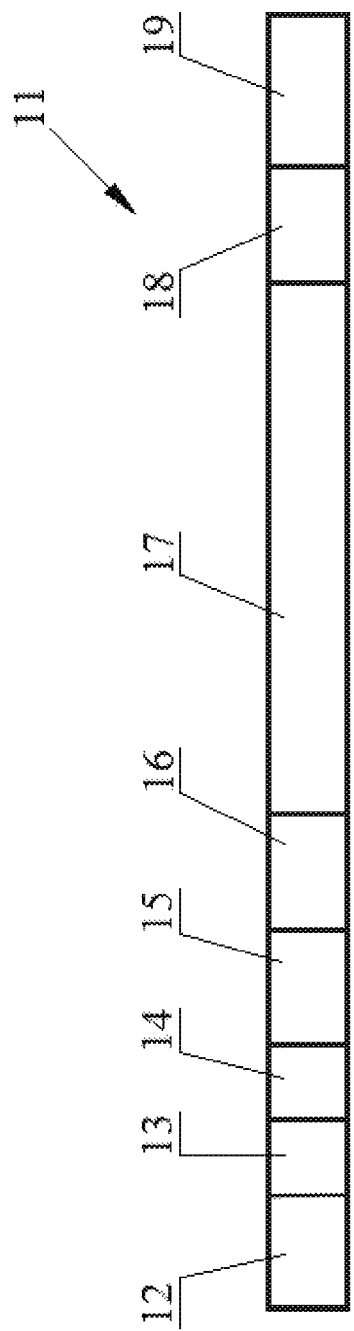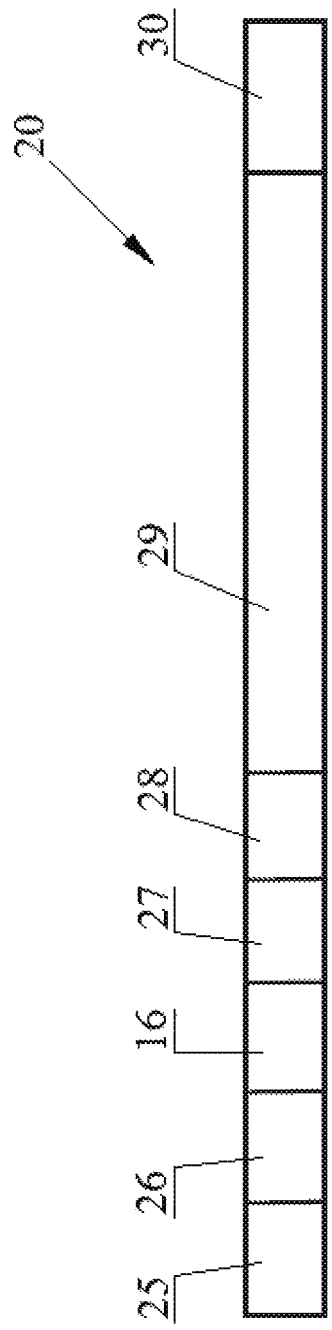
Fig. 4
Fig. 5

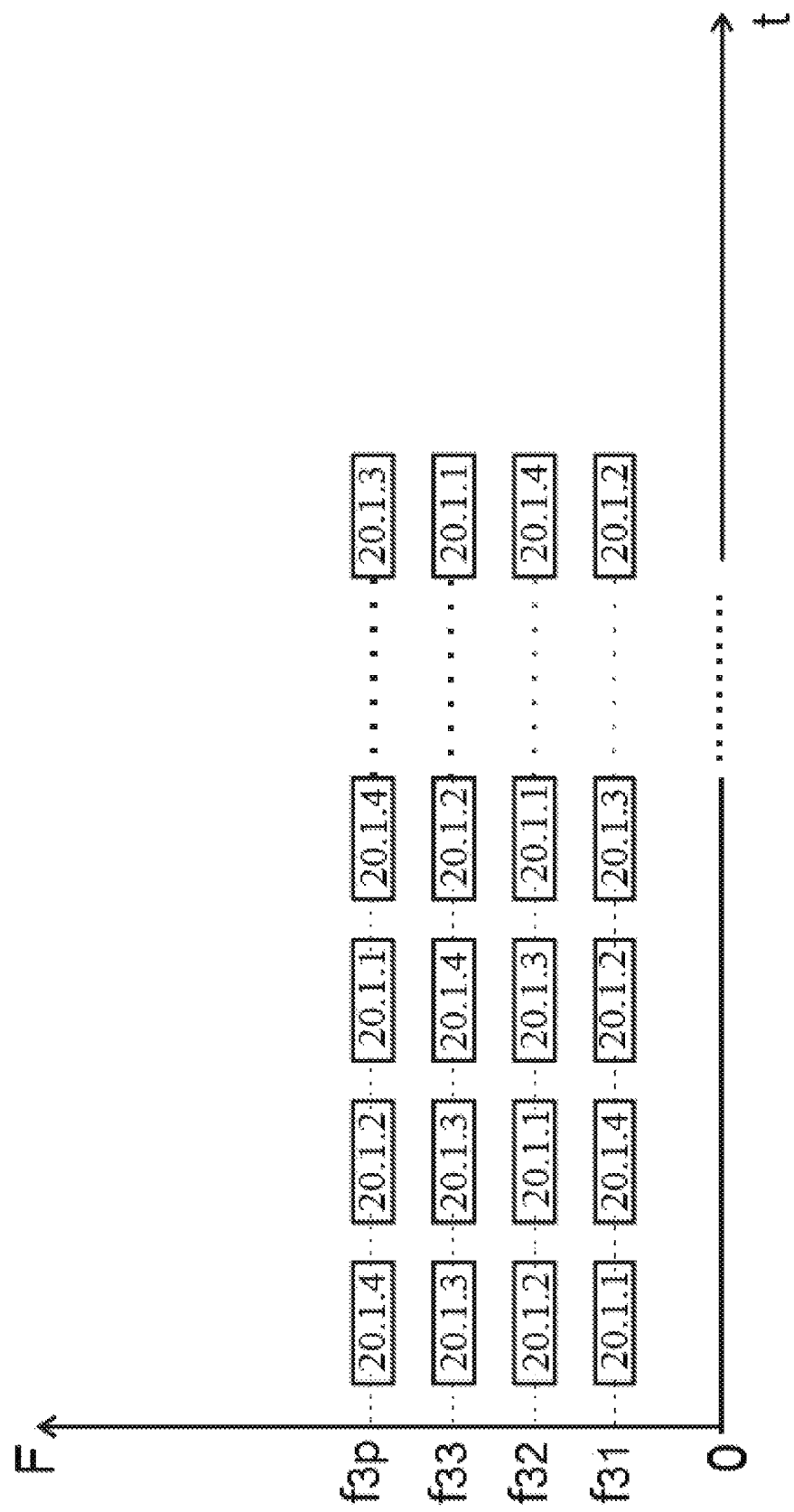

METHOD FOR WIRELESS COMMUNICATION BETWEEN SUBSCRIBERS AND BASE STATIONS

CROSS REFERENCE TO RELATED APPLICATIONS

This application is the National Stage of PCT/RU2019/000109 filed on Feb. 21, 2019, which claims priority under 35 U.S.C. § 119 of Russian Application No. 2018107611 filed on Mar. 1, 2018, the disclosure of which is incorporated by reference. The international application under PCT article 21(2) was not published in English.

FIELD OF THE INVENTION

The invention relates to networks consisting of wireless 5 transceivers connected by wireless communication into a single network, and can be used for wireless information transmission and data collection from various sensors and other instruments used to meter the consumption of various resources.

BACKGROUND OF THE INVENTION

Radio channel transmission of voice and data is used in many commercial, industrial and military applications. In some radio technology application, the size and power requirements of the transmitter and receiving equipment are not critical. For example, a radio station in a large city may have large transmitting towers from which radio signals can be transmitted over substantial distances. In other applications, such as when the transmitter and/or receiver are handheld devices using commercial market components, the size and power requirements of the equipment become much more crucial. As equipment becomes smaller, the available space for power supplies, usually a battery, becomes commensurately smaller. With a smaller power supply, the radio range decreases and/or the life span of the power supply decreases.

In applications where the power supply is severely limited, power can be conserved while narrowing the receiver bandwidth and thus reducing data transfer rate. Also, power in such situations can be kept at the same level, and data can be transmitted over a long distance by transmission in a narrow frequency band and with a corresponding data rate decrease. This method is known as UNB (Ultra Narrow Band, hereinafter referred to as UNB) modulation. The special feature of UNB is a simple and cheap transmitter, but a very complex and expensive receiver.

The UNB system can achieve long transmission distances and an excellent spectral efficiency. These methods, however, require significant computing power and highly stable (temperature compensated) generators, which limits their use in inexpensive applications.

Another way to increase the data transmission distance, while simultaneously reducing the data transfer rate, is to use wideband modulation methods—for example, wideband DSSS (direct sequence spread spectrum, hereinafter referred to as DSSS) modulation, or wideband CSS (chirp spread spectrum, hereinafter referred to as CSS) modulation. The DSSS and CSS peculiarity is low cost and simplicity, the disadvantage is the small communication channel data bandwidth.

Broadband modulation methods are used to improve noise and interference immunity in wireless communications. The various Bluetooth® protocols are examples of such methods. These modulation methods use spread spectrum and have low consumption and high bandwidth, but their range is limited to a few meters. Reducing the data rate can significantly increase the range.

Direct sequence spread spectrum methods are also known and can provide a very long communication range. In some cases, they have shown excellent noise immunity over long distances as shown in the GPS system.

The CSS communication systems mentioned above are especially useful for transmitting a limited amount of data at low power and over long distances when deploying a network with a small number of end nodes. With a large number of network nodes, communication may be limited by the maximum available network bandwidth.

CSS, DSSS, or UNB networks and other network systems can implement different strategies to avoid collisions, or at least reduce the possibility of their taking place, and thus make better use of the output power. However, these systems cannot exceed the theoretical network capacity and always impose cost in terms of power consumption and battery life compared to direct random access (also known as ALOHA).

A method for wireless communication between multiple endpoints over multiple base stations is known in the technical level, which comprises a transmitter-sent message including a modulated CSS preamble followed by a data body modulated at a narrower bandwidth, or a CSS or UNB modulation, receiving said message at the receiver, detection of frequency spreading of the preamble spectrum, equalization by the receiver of the local time reference for the time reference of the transmitter using the indicated frequency spreads of the preamble spectrum (see U.S. Pat. No. 9,647,718 published as of May 9, 2017).

The disadvantage of this method is the insufficiently high network bandwidth and the impossibility of completely eliminating collisions between the transmitted data network packets.

There is also a method known in the technical level for managing multiple endpoints by means of multiple base stations, which comprises sending a message to at least one endpoint and sending a response message to at least one base station, sending a response from the base station to the endpoint after receiving a response message, wherein the response contains many downlinks, at least two sequences, each of which contains a positive acknowledgment and an increase rate and a positive acknowledgment and a decrease rate, as well as additional escape sequences (see U.S. Pat. No. 9,525,454 published as of Dec. 20, 2016).

The disadvantage of this method is the insufficiently high network bandwidth and the impossibility of completely eliminating collisions between the transmitted network data packets.

A health monitoring system known from the technical level includes a plurality of sensor devices with radio frequency transceivers, a plurality of base stations with radio frequency transceivers for communication with one or more of the mentioned sensor devices in order to obtain monitored data, a central server connected to a plurality of base stations in order to obtain and register monitored data, each sensor device being associated with one base station located within the range and associated with another base station that is within the range when contact with the mentioned first base station is lost (see WO2009109779 published as of Sep. 11, 2009).

The disadvantage of the known solution is the insufficiently high network bandwidth.

The closest solution to the suggested method is a method of transmitting data for remote reading of sensor indicators, which consists in the fact that the computer initiating the interrogation through the central data transceiver device transmits an address request in the radio frequency range to the network of object data transceiver devices, the object data transceiver devices receive this request, and the object device, the address of which coincides with the address in the request, transmits the radio frequency range sensor data associated with it—these sensors are received by the central data transceiver device and are then transmitted to the computer for further processing, while all the object transceiver devices are divided into groups, the address request is a group one and its transmission is carried out using noise-like radio signals with a spread spectrum and with a greater spread spectrum factor, a group of object data transceivers, receiving this request with their group number, responds to it, and object data transceivers of this group respond simultaneously—each at an individual frequency within the allocated radio frequency band, using narrowband radio signals for transmission with a transmission rate of less than 480 bit/s, the central data transceiver unit performs multi-channel reception of these signals within the allocated radio frequency band, and the number of reception channels is selected as being equal to or more than the number of object transceiver devices in one group (see. RU2620369 published as of May 26, 2017).

The disadvantage of the known solution is the impossibility of building networks with a large coverage area for remote reading of sensor indicators.

SUMMARY OF THE INVENTION

The technical problem solved by the invention is to increase the spectral efficiency, increase the radio communication range and the coverage area of the remote reading of the sensor indicators.

The technical result of the invention is to increase the network bandwidth, eliminate collisions between transmitted data packets within the network, increase the coverage area of the remote reading of the sensor indicators.

The technical result of the invention is achieved through the implementation of the wireless communication method between subscribers and base stations, which consists in the fact that the subscribers are divided into groups, each of which has subgroups, each including at least one subscriber, the base stations are divided into groups, and all base stations of all groups have the same number of channels for receiving a UNB narrow-band modulation, and all base stations of each group have data channels with the same time and frequency characteristics, through all base stations messages are sent periodically to all subscribers, including the corresponding numbers of subscriber groups, all subscribers receive messages, decode them and if the group number of the corresponding subscriber coincides with the group number in the message received by him/her, all subscribers of this group send response messages to base stations using a UNB narrow-band modulation, and response messages are sent sequentially from of all subgroups of subscribers of this group, while subscribers of the subgroup send response messages at different frequencies, base stations receive response messages at all frequencies corresponding to subscribers, decode them and form a response message database, which is used to generate subsequent messages, including the corresponding numbers of subscriber groups, which cyclically repeat the periodic sending of the indicated subsequent messages and the reception of the response messages.

In addition, periodic messages can be sent to all subscribers using a wide-band CSS modulation or wideband DSSS modulation.

In addition, periodic messages can be sent to all subscribers using a narrow-band UNB modulation, and the base stations of each group can periodically send these messages simultaneously on different frequencies, while all subscribers can receive messages simultaneously on different frequencies.

In addition, periodic messages can be sent to all subscribers simultaneously from all base stations on the same frequency within each group and on different frequencies between different groups, and when receiving messages, each subscriber can scan the frequency of sending messages from base stations and can choose one of the frequencies with the best reception conditions to receive these messages.

In addition, periodic messages can be sent to all subscribers sequentially from all groups of base stations on the same frequency, and subscribers can send response messages in each cycle when all base stations sent all these messages.

In addition, each subscriber can determine the shift of its frequency relative to the base station frequency when receiving messages and can adjust its frequency by the value of this shift.

In addition, subsequent messages from base stations may include information on acknowledgment or non-acknowledgment of base station receipt of response messages during the previous sending of messages, while all subscribers of each group, when they receive subsequent messages from base stations, including information on acknowledgment of the receipt, send other subsequent response messages when the group number in the specified subsequent messages matches, and when they receive subsequent messages from base stations, including information on non-acknowledgment, they resend the previous response messages.

In addition, messages sent to all subscribers can also include the number of subscriber groups, whereby each subscriber can synchronize the transmission time of the response message with the receipt time of these messages from base stations, taking into account the number of subscriber groups.

In addition, messages sent to all subscribers can also include the number of subscriber groups, while each subscriber of each group can calculate the transmission time of subsequent messages for its group of subscribers after receiving the specified messages and can be involved in the reception mode only for the period of time the base stations transmit the specified subsequent messages for its group of subscribers in the next cycle with taking into account the number of subscriber groups.

In addition, each base station can have at least one additional reception channel, and at least one subscriber can send an additional message out of turn within its group on the frequency of at least one additional reception channel, and the additional message may include a preamble and an ID number.

In addition, at least one subscriber can send an additional message on any of the frequencies of the channels for receiving s UNB narrow-band modulation after all subscribers of its group have finished sending a response message, and an additional message may include a preamble and an ID number.

In addition, the subscribers can send a response message with a frequency hopping after the transmission of each symbol or each group of symbols included in the response message using a set of frequencies corresponding to subscribers for transmission.

In addition, base stations for each subgroup of subscribers can use associated pseudo-random frequency hopping algorithms for subscribers of each subgroup.

In addition, the base stations can send periodic messages and generate the response message database using a server.

In addition, the response message database can be transmitted at least to one information user via at least one communication channel.

LIST OF DRAWINGS

The invention is illustrated by drawings, where

FIG. 1 shows a diagram of information transmission from a plurality of subscribers through a plurality of base stations to information customers from subscribers;

FIG. 2 schematically shows the exchange of information between base stations and subscribers when groups of base stations operate on different frequencies;

FIG. 3 schematically shows the exchange of information between base stations and subscribers when groups of base stations operate on the same frequency, but at a different time interval;

FIG. 4 shows the structure of a message (parcel, data packet) of the base station;

FIG. 5 shows the structure of the subscriber's response message (parcel, data packet);

Figure 6:
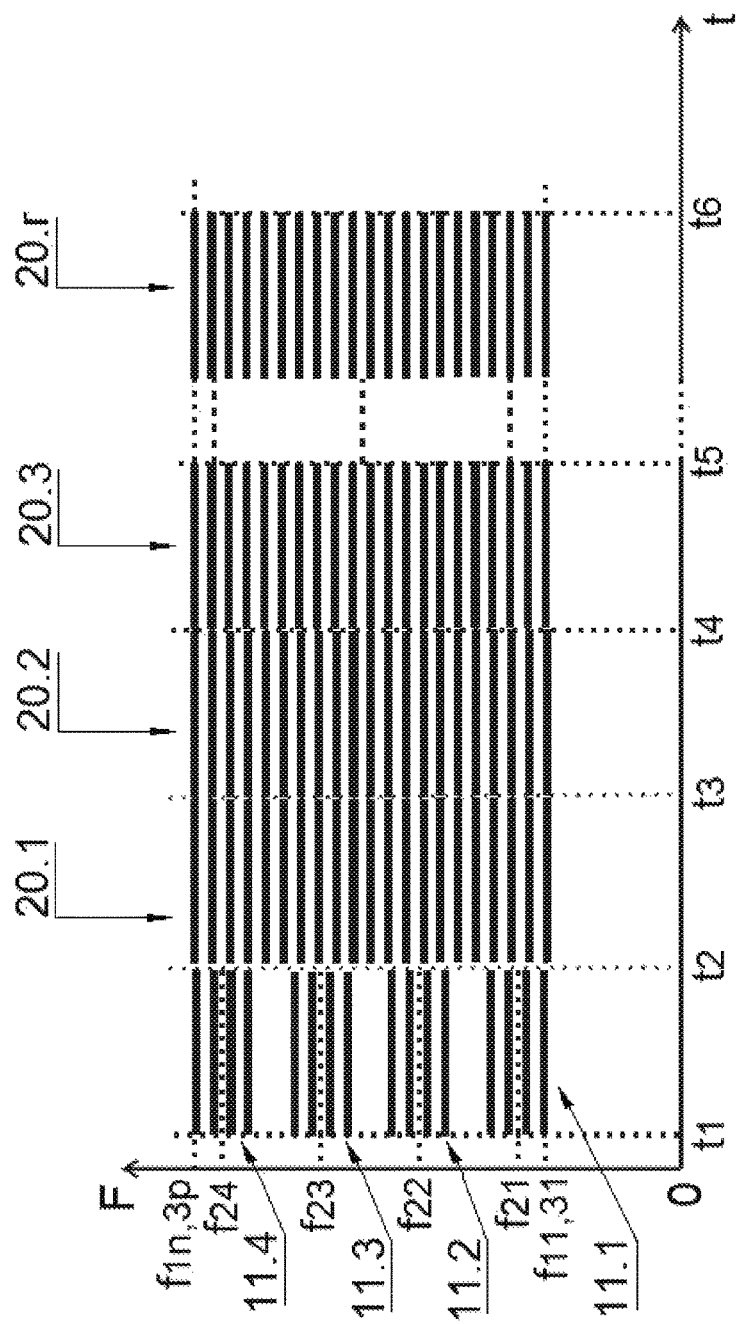
Figure 7:
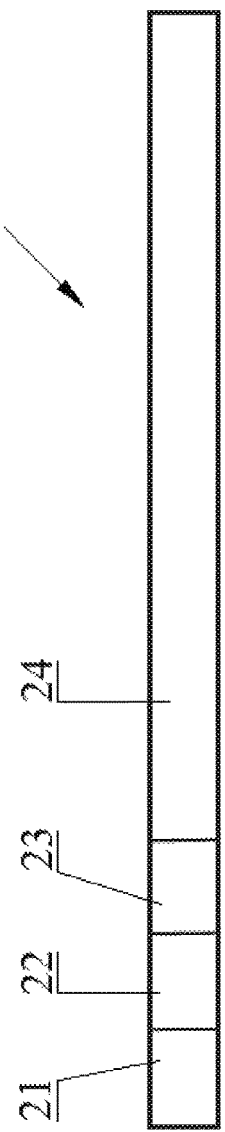
Figure 8:
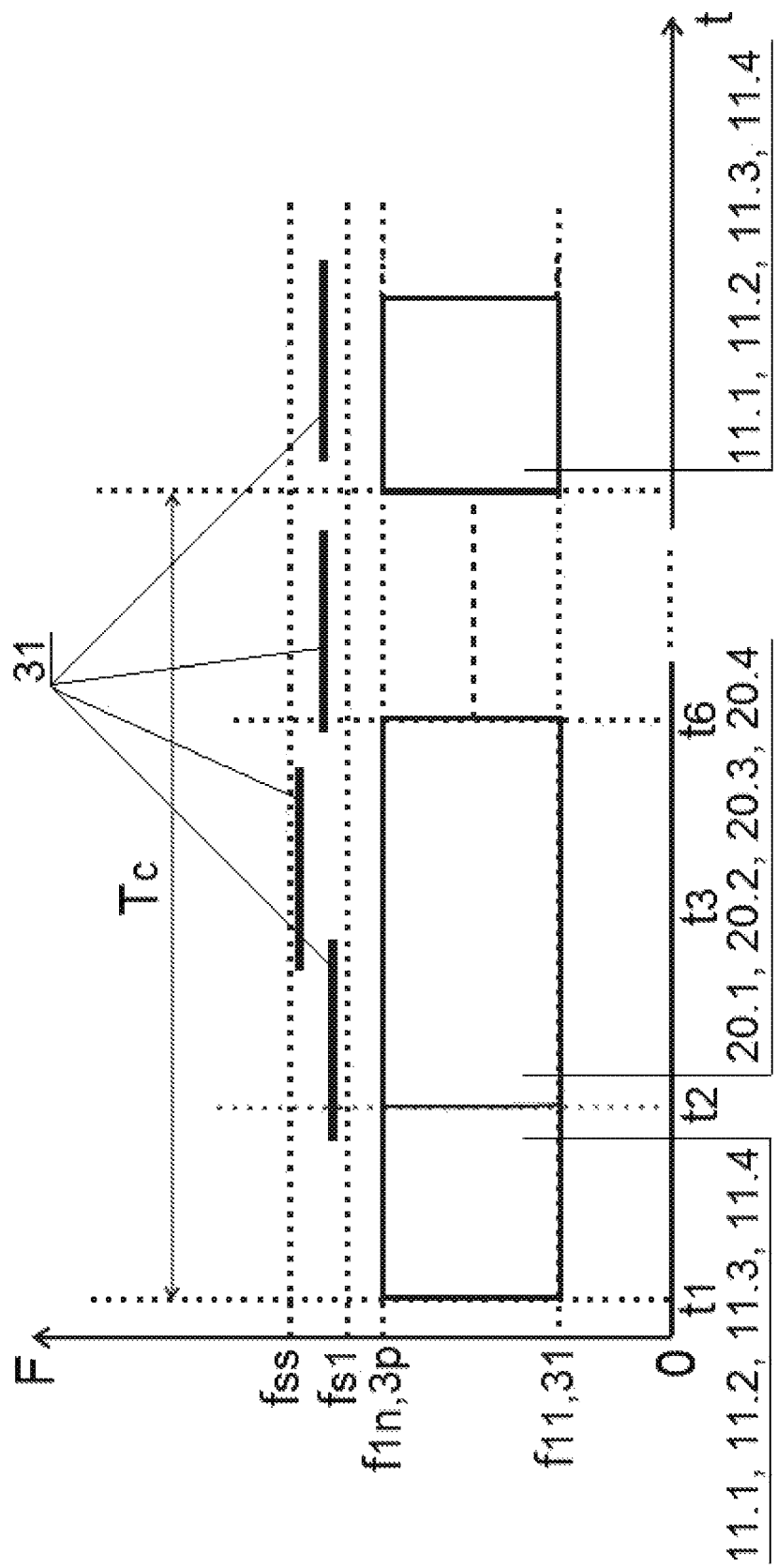
Figure 9:
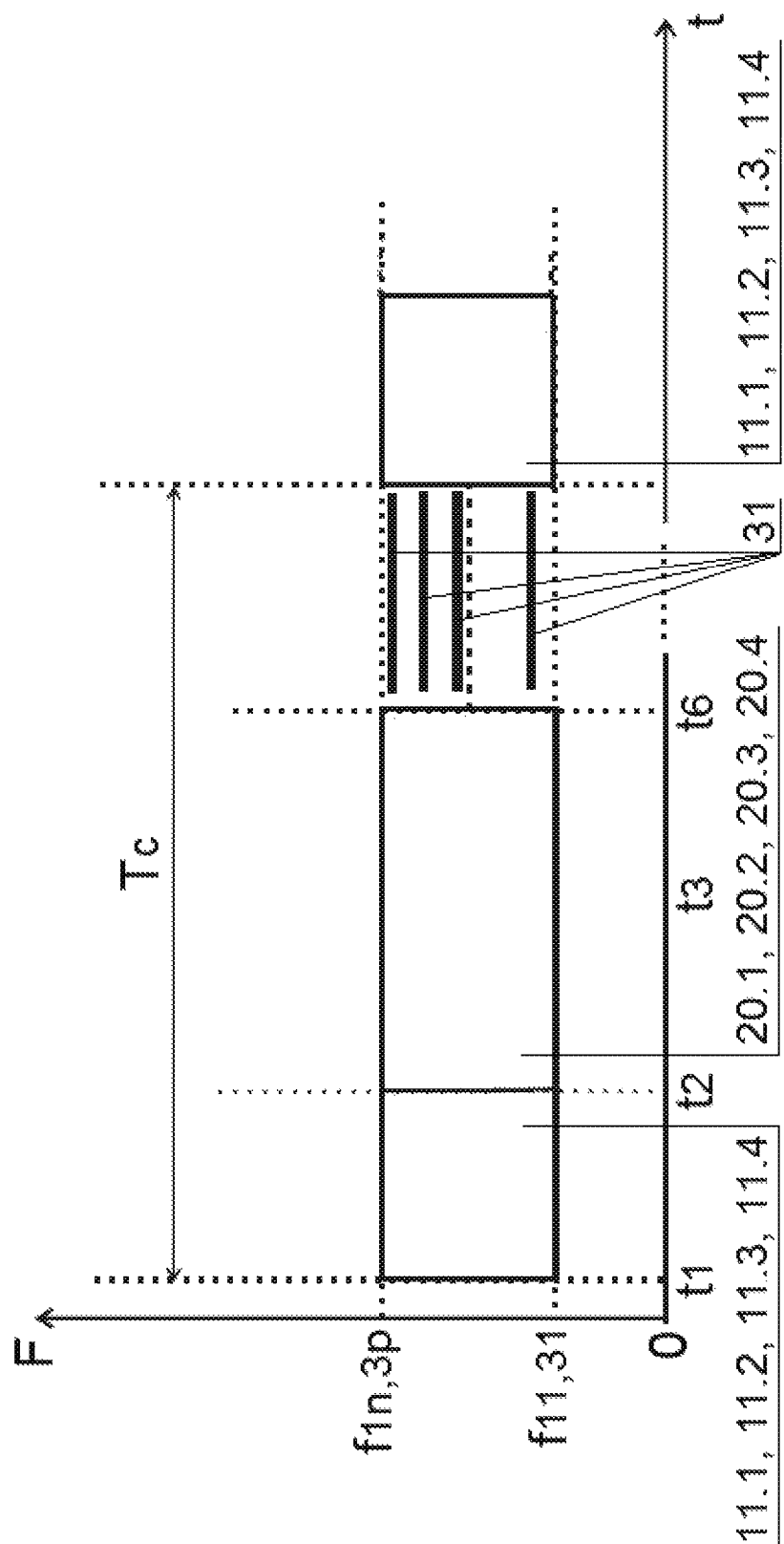
Figure 10:
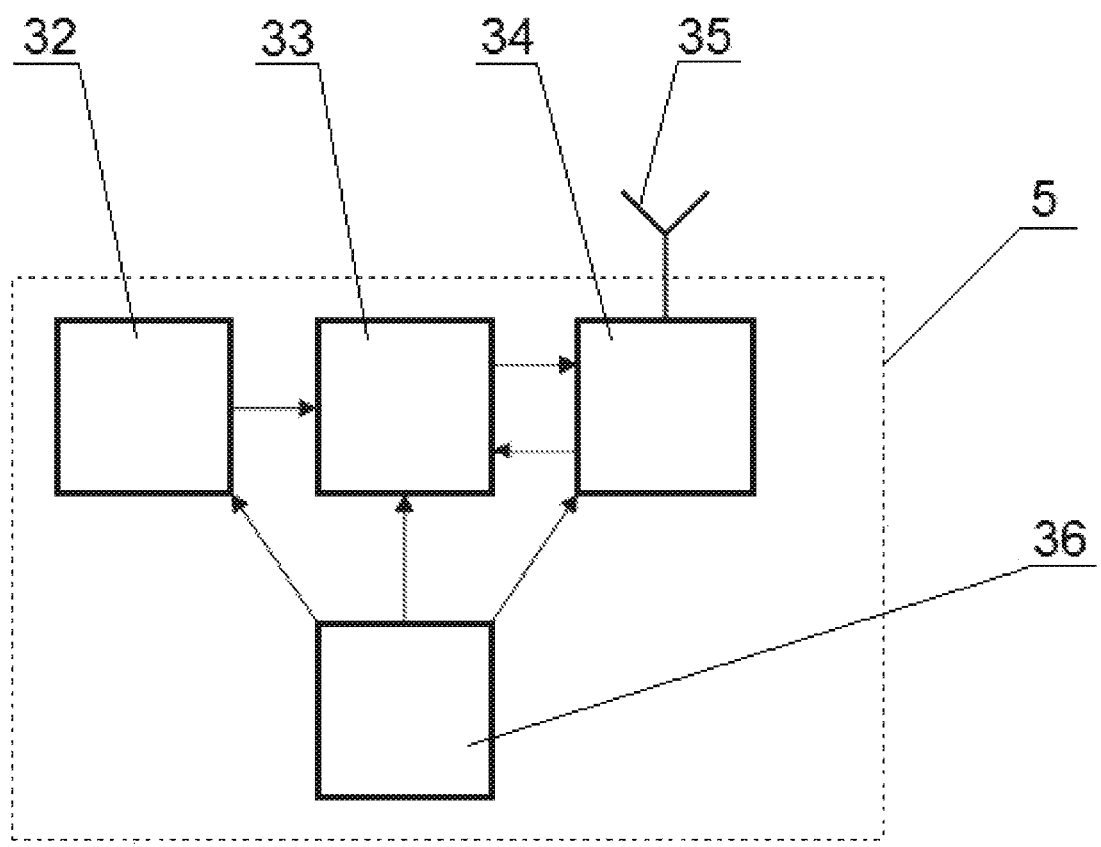

FIG. 6 schematically shows the exchange of information between base stations and subscribers when groups of base stations operate on different frequencies and when base stations use a UNB narrow-band modulation;

FIG. 7 shows the structure of the service message as part of the message (parcel, data packet) of the base station;

FIG. 8 schematically shows the exchange of information between base stations and subscribers when subscribers transmit emergency messages in an asynchronous mode;

FIG. 9 schematically shows the exchange of information between base stations and subscribers when subscribers transmit emergency messages in a synchronous mode;

FIG. 10 shows a subscriber's block diagram;

FIG. 11 schematically shows the exchange of information between base stations and subscribers when subscribers transmit response messages (parcels, data packet) with a hopping frequency change.

EMBODIMENTS OF THE INVENTION

The detailed description of the invention below provides references to figures which show, by way of illustration, certain realizations in which the invention can be realized to allow qualified professionals to implement the invention. It should be understood that the various embodiments of the invention, although different, are not necessarily mutually exclusive. For example, a particular function, structure, or characteristic described below in connection with one implementation may be implemented in other embodiments without departing from the scope of the invention. In addition, it is to be understood that the arrangement of the individual elements in each disclosed embodiment may be varied without backing off from the scope of the invention. The following detailed description shall not be taken in a limiting sense, and the scope of the present invention is determined only by the added requirements, which are appropriately interpreted together with the full range of equivalents which the requirements are focused on.

The wireless communication method between subscribers (a plurality of subscribers, endpoints) and base stations (a plurality of base stations) is carried out using a system that includes the following: base stations (BS) 1, 2, 3, 4, subscribers 5 (endpoints), data server 6, information customers 7 (data from subscribers 5), communication channels 8 between base stations 1-4 and server 6, communication channels 9 between server 6 and customers 7.

Base stations 1-4 form a cellular network 10 of base stations 1-4. Subscribers 5 (of endpoints) can be any devices, sensors, for example, temperature sensors, consumed thermal or electrical energy sensors, gas consumption sensors, water consumption sensors, and any other detectors (sensors) equipped with low-power transceivers for transmitting the readings of these sensors. Any available communication channels—wired or wireless, for example, radio channels, the Internet or other possible channels providing data transmission at a distance—can be used as communication channels 8. For example, GSM, 3G, 4G, Internet or other possible channels providing data transmission at a distance can be used As communication channels 9, both wired and wireless communication channels. Any organizations involved in metering heat and electricity, water, gas, etc., as well as any other persons who may be interested in receiving data (information) from the specified subscribers 5 can be viewed as customers 7 of information.

Figure 1:
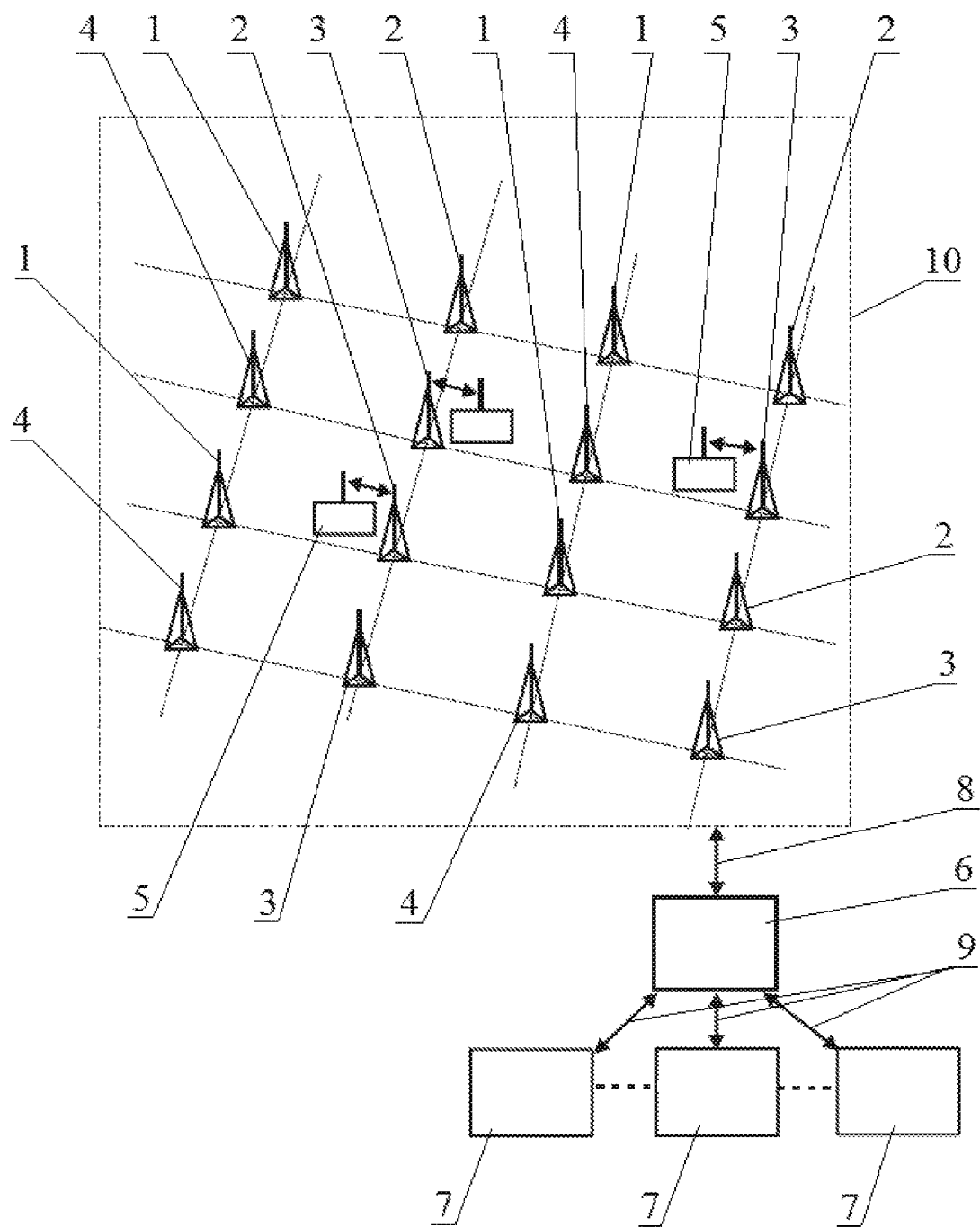

The wireless communication method between subscribers 5 and base stations 1-4 is as follows. All base stations 1-4 are divided into groups, and the quantity (number) of k groups can be any depending on the served area and on how many different base stations are used in the network 10. The following four types of different base stations are used in the proposed description (BS 1, BS 2, BS 3, BS 4), i.e., four groups of base stations (k=4) are used in total, each of which includes a certain number of identical base stations depending on the area of the terrain on which they are located and which need to be served by the network 10 (FIG. 1). In this case, the first group (k1) of base stations includes all the same BS 1, the second group (k2) includes all identical BS 2, the third group (k3) includes all identical BS 3 and the fourth group (k4) includes all identical BS 4. However, network 10 may also include a smaller number of groups (for example, k=2, i.e. identical BS 1 and identical BS 2 are used in a small network 10, or k=3, i.e. identical BS 1, identical BS 2 and identical BS 3 are used in network 10). Network 10 may also include more k groups of base stations (for example, k=5 or 6, etc., depending on the area of the served territory, the number of served subscribers 5, the size of the network 10). The cellular network of base stations 1-4 is connected via channels 8 to data server 6.

Base stations 1-4 form cells of cellular network 10, and each cell of network 10 is formed by four base stations 1-4 (in the case if k=4, as described in the above description and shown in FIG. 1). The alternative version of the invention, as an example of one of the practical implementations of network 10, can include three or more base stations in one cell. Also, one or more identical base stations may be used in the alternative version of the invention for small networks 10.

All base stations 1-4 of all k groups have the same number of n channels receiving a UNB narrowband modulation, and each separate receiving channel from n channels of each base station (BS 1, 20 BS 2, BS 3, BS 4) has its own operating receiving frequency $f_{1,n}$ (i.e. all receiving channels of any base station 1-4 have different operating frequency in the $f_{11}$-$f_{1n}$ frequency range). All base stations of each k group have data transmission channels with the same time and frequency characteristics. The specified data transmission channels may differ in different groups k1, k2, k3, k4 of base stations, or they have different operating frequencies $f_{2,k}$ (since k=4 in the description above, then the data transmission channel BS 1 operates on one frequency $f_{21}$, data transmission channel BS 2 is on another frequency $f_{22}$, etc. in the $f_{21}$-$f_{24}$ frequency range), or all base stations 1-4 of all k groups operate on one of the frequencies $f_{2,k}$, but are separated by time t (i.e. the data transmission channels of BS 1-4 operate on one frequency, for example, $f_{21}$, but the time interval is different, first it's all BS 1, then it's all BS 2, etc.).

Subscribers 5 are divided into groups (for example, m groups, where m is the number of subscriber groups 5 in network 10), and each subscriber group 5 is formed from a plurality of subscribers 5 (for example, several different sensors described above), and the total number of m subscriber groups 5 can be one or more groups depending on the area of the territory, served by network 10. Each subscriber group 5 has subgroups (for example, r subgroups, where r is the number of subgroups in one subscriber group 5), and each subgroup of subscribers 5 is formed by one type of subscribers 5, i.e. one subgroup, for example, No. 1 (r1) is formed, for example, from water sensors, another subgroup (No. 2, r2) is formed, for example, from gas sensors, the third subgroup (No. 3, r3) is formed, for example, from electrical energy sensors and so on. Each r subgroup of subscribers 5 can include either one subscriber 5, or two subscribers 5, or any greater quantity (number) p of subscribers 5. Moreover, each subscriber 5 in one subgroup has its own separate operating frequency $f_{3,p}$ (p is the number of subscribers 5 in one subgroup, and the operating frequency range of subscribers 5 in one subgroup is $f_{31}$-$f_{3p}$). Each subscriber 5 has its own individual identification number ID, consisting, for example, of the m group number of subscribers 5, the r subgroup number of subscribers 5 and the p number of the subscriber 5 in the r subgroup of subscribers 5.

Further, according to the proposed invention, the implementation of the method consists in sending the same messages 11 (data packet 11.1, 11.2, 11.3, 11.4) through all base stations 1-4 using server 6 using periodically server 6 (i.e. with certain periods from the first group No. 1 of subscribers 5 to the last group No. m of subscribers 5).

Messages 11 (data package 11, parcel, FIG. 4) may include: preamb10le (marker) 12, number 13 of k group of base stations (in the given example of the description, number 13 in particular message 11 is accepted as either one or two, or three or four since k=4), number 14 of k groups of base stations (in the given example of the description, number 14 is accepted as four since k=4), number 15 of m groups of subscribers (number 15 can be from one to m, m can be equal to any maximum possible number of groups of subscribers 5 in the network 10, depending on the area served by the network 10), corresponding number 16 of requested group m of subscribers 5 (from No. 1 to No. m), message 17 (information) about acknowledgement (or non-acknowledgment) of reception by base stations of response messages 20 from subscribers 5 of requested group m at the previous request of this group of subscribers 5, service message 18 and checksum 19 (the checksum is the term commonly used in information transmission systems, when each packet is accompanied by an additional information packet formed from the transmitted packet via a special algorithm. Co-processing on the receiving side of both packages allows detecting errors in the accepted package and fixing them in some cases). Service message 18 being transmitted as part of data package 11 of base stations 1-4 may contain the message (information) for a particular subscriber 5 of the requested m group of subscribers 5, or for the entire requested m group of subscribers 5. One of the possible variants of the structure of service message 18 within the parcel of base stations 1-4 is shown in FIG. 7. Service message 18 may contain, for example: nark 21 of the message, e.g. "0", if the message is addressed to all subscribers of 5 of the specific r, or "1" subgroup, if the message is addressed to one subscriber of 5 of the specific m group; number 22 of r subgroup (from No. 1 to No. r); number 23 of subscriber 5 in the given r subgroup (from No. 1 to No. r); message 24 (any information that shall be sent to the subscriber(s), e.g. about the need to pay for services, tariff change, service disconnection, etc.). Since requests of subscribers 5 by base stations 1-4 are carried out cyclically, then at the first request (when switching on the system) there will be no information (message 17) about acknowledgment (or non-acknowledgement) of receiving response messages 20 by base stations 1-4, and this information will be transmitted starting from the second request and further. Not all of the listed components (12-19) of data package 11 transmitted by base stations 1-4 are mandatory. If necessary, other necessary data included in message 11 may also be transmitted.

After all base stations 1-4 send messages 11 to all subscribers 5, all subscribers 5 receive these messages 11 and decode them. When the m group number of the corresponding subscriber 5 matches the m group number in the received message 11 from base stations 1-4, all subscribers 5 from this m group of subscribers 5 form and send (transmit) response messages 20 (response data packet 20) to base stations 1-4 using a UNB narrow-band modulation. Response messages 20 can be sent to the nearest base stations 1-4 located as close as possible to the corresponding subscriber 5 or to any other base stations 1-4 in the network 10. All subscribers 5 of the specified m group of subscribers 5 send consistently from all r subgroups of subscribers 5 of this m group, and subscribers 5 of one r subgroup send response messages 20 on different $f_{3,p}$ frequencies in the $f_{31}$-$f_{3p}$ frequency range (the $f_{31}$-$f_{3p}$ frequency range corresponds to the $f_{11}$-$f_{1n}$ frequency range of receiving channels of the UNB narrowband modulation of base stations 1-4). Thus, response messages 20 to base stations 1-4 are sent first by all subscribers 5 from subgroup No. 1 (r1, messages 20.1) of their m group, each on one of the frequencies in the corresponding $f_{31}$-$f_{3p}$ range, then all subscribers 5 from subgroup No. 2 (r2, messages 20.2, also each on one of the frequencies in the corresponding $f_{31}$-$f_{3p}$ range), then all subscribers 5 from subgroup No. 3 (r3, messages 20.3, also each on one of the frequencies in the corresponding $f_{31}$-$f_{3p}$ range) of this m group and so on up to subgroup No. r (messages 20.*r*, FIGS. 2, 3).

The structure of response messages 20 (response data packet 20 of subscribers 5) is shown in FIG. 5. Data packet 20 can contain, for example: marker (preamble) 25, number 26 of the system (several systems belonging to different customers can operate simultaneously, for example, with a separation in time; subscribers only respond to requests from their own system), number 16 of m group of subscribers 5, number 27 of r subgroup of subscribers 5, number 28 of subscriber 5 in r subgroup (for example, from No. 1 to No. p), message 29 of subscriber 5 and checksum 30 (by analogy with checksum 19).

After subscribers 5 send response messages 20, all base stations 1-4 carry out n-channel reception of response messages 20 (data packets 20.1-20.*r*) from subscribers 5 using a UNB narrowband modulation on all $f_{11}$-$f_{1n}$ frequencies corresponding to $f_{31}$-$f_{3p}$ frequencies of subscribers 5.

In response messages 20 from subscribers 5, the transmission of marker (preamble) 25, system number 26, number 16 of m group of subscribers 5, number 27 of r subgroup of subscribers 5 and number 28 of subscriber 5 in r subgroup are optional. The start of transmission of data packets 20 of subscribers 5 is rigidly tied to the end of the transmission of data packets 11 of base stations 1-4 (FIGS. 2, 3), therefore, the transmission of marker (preamble) 25 is not necessary. Base stations 1-4 can determine the belonging of the received data packet 20 to one of the subgroups (No. 1-No. r) as per t1, t2, t3, etc. time intervals of the beginning of reception of the corresponding subgroup r of subscribers 5, and base stations 1-4 can determine number 28 of subscriber 5 in r subgroup by the number of the frequency on which the data packet 20 is received. Thus, base stations 1-4 can calculate the identification number (ID) for the corresponding subscriber 5 that transmitted this data for each received response message 20 from the corresponding subscriber 5 using checksum 30.

When base stations receive 1-4 response messages 20 (20.1-20.r), base stations 1-4 decode the received response messages 20. All response messages 20 received by base stations 1-4 from subscribers 5, provided with ID numbers, are transmitted via communication channels 8 to server 6, on which according to the received response messages 20, a database is formed from the received response messages 20 from subscribers 5. This database is used to generate subsequent messages 11 of base stations 1-4, while subsequent messages also include: preamble (marker) 12, number 13 of k group of basic stations, number 14 of k groups of base stations, number 15 of m groups of subscribers 5, the corresponding number 16 of the requested m group of subscribers 5, message 17 (information) on acknowledgment of the receipt by base stations of response messages 20 from subscribers 5 of the requested m group during the previous request of this group of subscribers 5, service message 18 and checksum 19. In this case, the mandatory components of subsequent messages 11 are: number 16 of the requested m group of subscribers 5 and message 17 (information on acknowledgement or non-acknowledgement of reception).

Further, the implementation of the method consists in the fact that base stations 1-4 using server 6 cyclically alternately poll all m groups of subscribers 5, i.e. repeat cyclically the periodic sending of subsequent messages 11, and base stations 1-4 repeat the reception of response messages 20 from subscribers 5. In this case, each cycle consists in alternate polling group No. 1 of subscribers 5, then group No. 2 of subscribers 5, then group No. 3 of subscribers 5 and so on up to group No. m of subscribers 5 with certain periods.

After base stations 1-4 poll one m group of subscribers 5 and receive information (data, response messages 20) from subscribers 5 of one m group, the specified data is transmitted from all base stations 1-4 via communication channels 8 to server 6, server 6 generates a file (message 17) of acknowledgement of receipt from the subscribers 5 of one m group after the request of this m group. The file (message 17) contains p r symbols (by the number of subscribers 5 in one m group of subscribers 5). Each subscriber 5 of one m group of subscribers 5 in the specified file corresponds to one symbol (one bit), for example, corresponding to the ordinal number of subscriber 5 in his group of m subscribers 5. The symbol "0" corresponds to the absence of response message 20 from subscriber 5 when requesting its m group, symbol "1" corresponds to the successful reception of response message 20 from subscriber 5. Server 6 together with number 16 of the m group of subscribers 5 transmits this file to all base stations 1-4. At the next request of this m group of subscribers 5, base stations 1-4 transmit this file as part of their data packet 11 as message 17 (FIG. 4) on acknowledgment of base stations 1-4 reception of response messages 20 from subscribers 5 of the requested m group when the previous request of this m group of subscribers 5.

When receiving subsequent messages 11 from base stations 1-4 (addressed to this specific m group of subscribers 5) according to message 17 contained in it, acknowledging (or not acknowledging) the reception of response messages 20 on the part of base stations 1-4 from subscribers 5 of the corresponding requested m group at the previous request of this m group of subscribers 5, all subscribers 5 of the corresponding m group of subscribers 5 transmit the subsequent next response message 20 when acknowledging the receipt of the previous response message 20 from the corresponding subscriber 5 of this m group, and if the reception is not acknowledged, subscribers 5 repeat sending their previous response message 20. That is, for example, if subscribers 5 from group No. 1 accepted messages 11 from base stations, which contain information 17 acknowledging the correct reception of the previous response message 20 from subscribers 5 of this group No. 1, then all subscribers 5 from this group No. 1 send the subsequent next response messages 20 (if the number of group No. 1 matches in the specified subsequent messages 11), and if subscribers 5 from this group No. 1 accepted messages 11, which contain information 17 that does not confirm the correct reception of the previous response message 20 by base stations 1-4 from subscribers 5 of this group No. 1 (this occurs already when polling group No. 2, etc. of subscribers 5), then all subscribers 5 from this group No. 1 re-send their indicated previous response messages 20 (if the number of group No. 1 in the specified subsequent messages 11 does not match). That is, acknowledgement information 17 determines the correct reception of response message 20 from the corresponding subscriber 5 at its previous request. This information is correct if message 11 was received by subscriber 5 with the coincidence of number 16 of the m group, and if number 16 of the m group did not match, then the information is not correct, namely, not the one, which acknowledges the receipt of response message 20 from subscriber 5.

All response messages 20 received from subscribers 5 are accumulated on server 6, where a database of response messages 20 is formed. These response messages (database) via existing communication channels 9 from subscribers 5 are transmitted to the information user, i.e. information is received by customers 7.

According to the proposed method, the transmission of messages 11 (including subsequent messages 11) from base stations 1-4 is possible in two variants.

Figure 2:
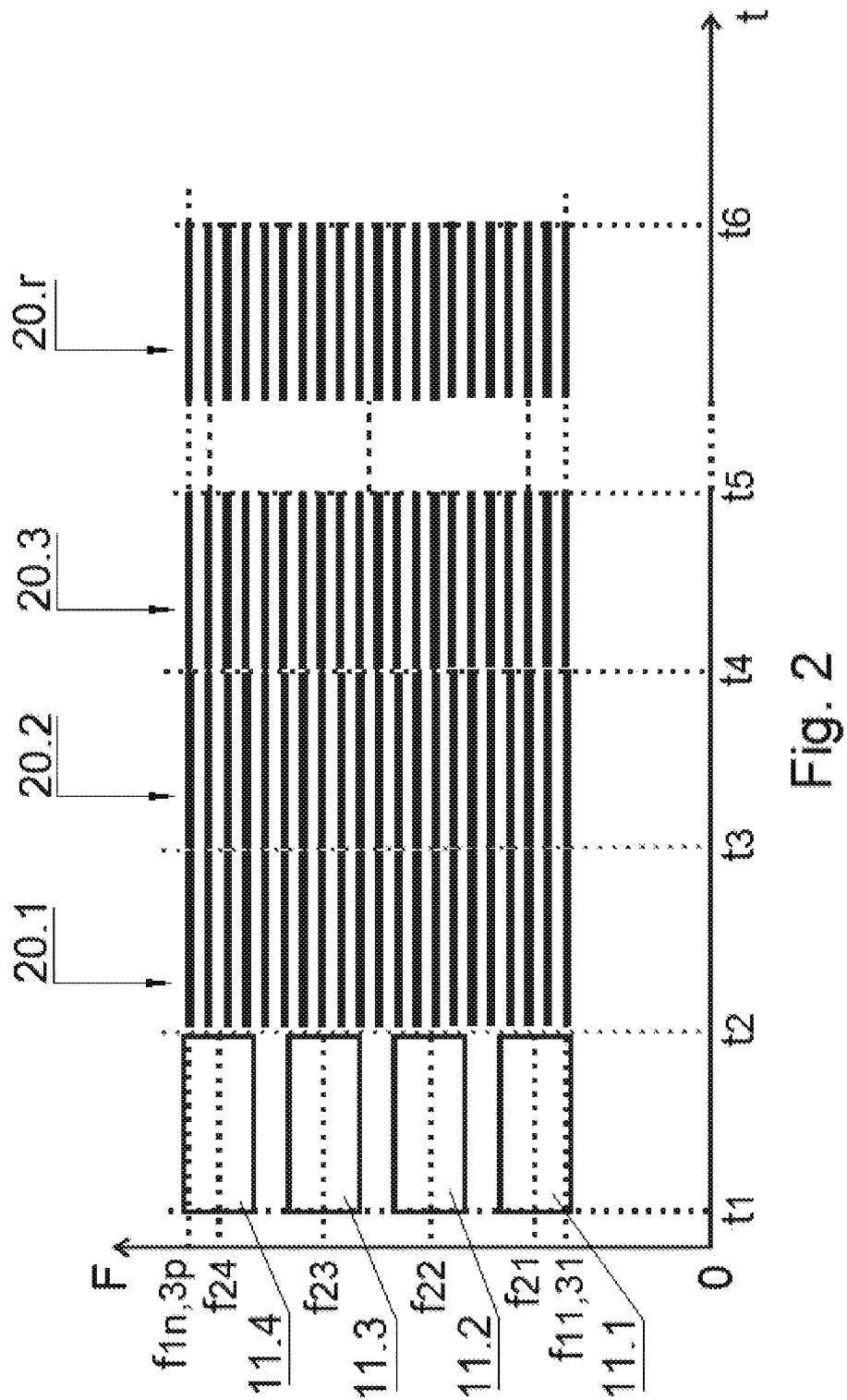

1) The first variant is illustrated in FIG. 2 and consists in information exchange between all base stations 1-4 and all subscribers 5 when all k groups of base stations 1-4 work simultaneously, but on different frequencies f2,k (i.e. on the same frequency within each group of base stations and on different frequencies between different groups of base stations). In this case, by means of all base stations 1-4 of all k groups (k=4 in the described variant) identical messages 11 (data pack 11) are simultaneously sent to all subscribers 5, and all base stations 1 of the first group (k1) of base stations send messages 11 on the frequency $f_{21}$, all base stations 2 of the second group (k2) of base stations send messages 11 on frequency $f_{22}$, all base stations 3 of the third group (k3) of base stations send messages 11 on frequency $f_{23}$, and all base stations of the fourth group (k4) of base stations send messages 11 on frequency $f_{24}$.

All base stations 1-4 are switched on to transmit messages 11 (including subsequent ones) in $t_1$-$t_2$ time interval and all base stations 1-4 simultaneously transmit the same data packet 11, the structure of which is shown in FIG. 4.

After all base stations 1-4 send messages 11 to all subscribers 5, each subscriber 5 receiving messages 11 scans all frequencies f2, k (in the $F_{21}$-$f_{24}$ range), on which messages 11 were sent from base stations 1-4, and selects one of the frequencies $f_{2,k}$ to receive messages 11 with the best reception conditions at the location of the corresponding subscriber 5. That is, each subscriber 5 receives a message on $f_{2,k}$ frequency, which is most favorable for this subscriber 5, for example, in terms of proximity or signal strength, etc.

Subscribers 5 determine the moment $t_2$ of the beginning of data packet transmission 20 in each polling cycle by the time of data packet transmission end 11 simultaneously by all base stations 1-4.

Figure 3:
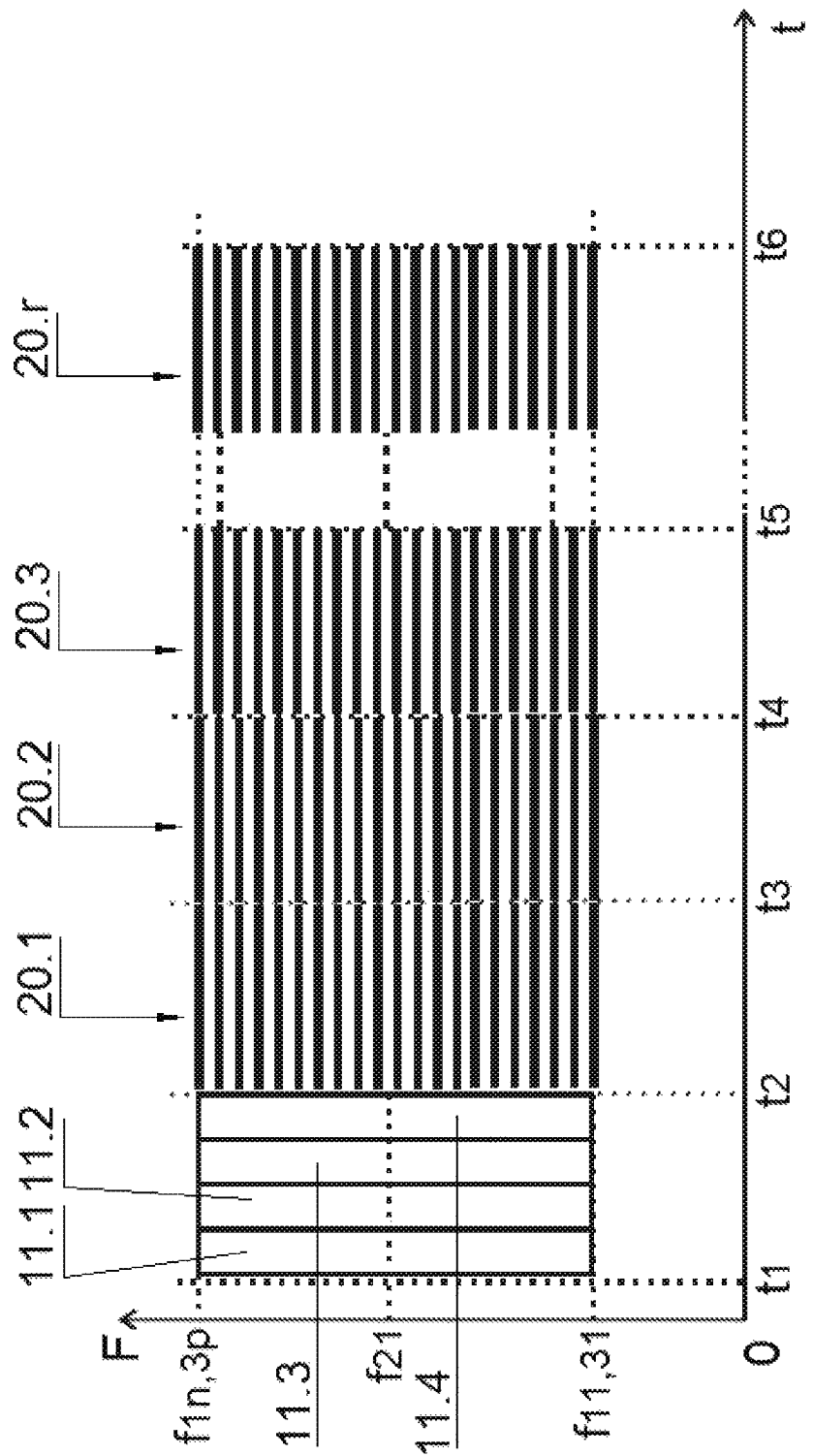

2) The second variant is illustrated in FIG. 3 and consists in exchange of information between all base stations 1-4 and all subscribers 5 when all k groups of base stations are working one after another (groups of base stations are switched on one after another, i.e. k1 group is first, then it's k2, then goes k3, and then it is k4), and base stations 1-4 of all k groups send the same messages 11 on the same frequency f2k in some frequency range (e.g. $f_{21}$ frequency). In this case, identical messages 11 (identical data packet 11, FIG. 4) on one of the $f_{2,k}$ frequencies (e.g. on $f_{21}$ frequency) are sent simultaneously to all subscribers in the t1-t2 time interval (also with defined periods) via all base stations of the first group (k1) of the base stations, then simultaneously via all base stations of the second group (k2), then simultaneously via all base stations of the third group (k3), and then simultaneously via all base stations of the fourth group (k4).

According to this version of information exchange (FIG. 3), the subscribers 5 determine the moment t2 of beginning the transmission of data packet 20 in each polling cycle after ending the transmission of data packet 11 by the base stations of the last k group of base stations (in the proposed description, for example, the fourth group k4 of base stations 4). In this case, all base stations 1-4 shall transmit number 13 of their k group of base stations and the total number of 14 (quantity) of k groups of base stations 1-4. Having received a data packet even from any base station, according to number 13 of the base station group and according to the total number (number 14) of k groups of base stations 1-4, and knowing the duration of the transmission time of the data packet 11, the subscriber 5 can calculate the start time t2 of data package 20 transmission on the part of subscriber 5.

In both versions (FIG. 2 and FIG. 3), base stations 1-4 is synchronized from server 6. Server 6 sequentially issues commands to all base stations 1-4 for cyclic polling of all m groups of subscribers 5 starting with subscriber group No. 1 to subscriber group No. m. Then the cyclic polling is repeated. In this case, messages 11 sent to all subscribers 5 include number 15 of m groups of subscribers 5, and each subscriber 5 synchronizes the transmission time of response message 20 with the reception time of messages 11 from base stations 1-4, taking into account number 15 of m groups of subscribers 5. In addition, each subscriber 5 of each m group can calculate the transmission time of subsequent messages 20 for its m group of subscribers 5 after receiving messages 11 and can be switched on in the reception mode only for t time period of transmission by base stations 1-4 of subsequent messages 20 specifically for its m group of subscribers 5 in the next cycle, taking into account number 15 of m groups of subscribers 5.

For all variants of the method implementation (FIG. 2, FIG. 3) subscribers 5 of one m group of subscribers 5 start data packet transmission as follows: subgroup No. 1 of subscribers 5 (messages 20.1) does at t2 time intervals, subgroup No. 2 of subscribers 5 (messages 20.2) does at t3 time intervals, subgroup No. 3 of subscribers 5 (messages 20.3) at t4 time intervals and so on until the last subgroup No. r of subscribers 5 (messages 20.r). All subgroups (No. 1-r) of subscribers 5 have the same t time duration of data transmission, so knowing t2 time interval and number 27 of their subgroup r, subscriber 5 can calculate the time of start of their response message transmission 20 (to activate the operating mode).

FIGS. 2, 3 show that the proposed method makes it possible to eliminate collisions between the transmitted data packets 11, 20, between base stations and subscribers 5 and to increase the bandwidth of network 10 due to the fact that not all subscribers 5 simultaneously transmit their data packets.

All subscribers 5 shall have a high transmitter frequency set-on accuracy to avoid mutual frequency collisions when transmitting response messages 20. This is achieved primarily by using a high-precision VCTCXO generator. However, in some cases this may be insufficient, in this case, the average transmission frequency $f_{2k}$ of base stations 1-4 is used as a reference, while adjusting automatically the transmission $f_{3p}$ frequency of subscriber 5. Known methods can be used for this purpose, such as those described in patent application No. US2014219325 A1. In this case, each subscriber 5 receiving messages 11 (including subsequent ones) from base stations 1-4 determines the shift of its operating frequency relative to the f2k frequency corresponding to base station 1-4 and adjusts its operating frequency by the value of this shift by adjusting the VCTCXO generator frequency, by feeding it the necessary corrective voltage, or by changing the synthesizer frequency.

The wideband CSS modulation can be used to transmit (send) periodically data packets 11 to subscribers 5 by means of base stations 1-4. Using CSS allows you to provide a greater range of data transmission from base stations 1-4 to subscribers 5 with the simplicity of demodulation and decoding of signals by subscribers 5.

In addition, the broadband DSSS modulation can be used to transmit data packets 11 to subscribers 5 by means of base stations 1-4 (for example, as is done in the CC1350 SimpleLink™ Ultra-Low-Power Dual-Band Wireless MCU Texas Instruments Incorporated circuit, which allows you to provide a large communication range in the DSSS mode). Using DSSS makes it possible to provide a long range of data transmission from base stations 1-4 to subscribers 5 with the simplicity of demodulation and decoding of signals by subscribers 5.

In addition, a narrow-band UNB modulation can be used to transmit data packets 11 to subscribers 5 by base stations 1-4. Using UNB makes it possible to provide a long range of data transmission from base stations 1-4 to subscribers 5, however, the implementation of demodulation and decoding of UNB signals by subscribers 5 is more complicated in comparison to using CSS and DSSS. When sending periodically data packets 11 using a narrow-band UNB modulation, base stations 1-4 can simultaneously send data packets 11 on different frequencies, while subscribers 5 can receive data packets 11 also simultaneously on different frequencies.

Base stations 1-4 can simultaneously transmit several UNB data packets 11 to increase the amount of information transmitted from base stations 1-4 to subscribers 5, for example, to transmit additional control commands FIG. 6 shows an example of using base stations 1-4 transmitting simultaneously four UNB data packets on different frequencies. In this case, one UNB data packet can be addressed to one or more r subgroups of subscribers 5, which shall be tuned to the frequency of receiving their data packet. The second option is that each subscriber 5 simultaneously receives several UNB data packets from base stations 1-4, for example, using FFT. This option is more complicated, but it allows subscribers 5 to receive more information from base stations 1-4, for example, to receive the acknowledgement of receipt of previously transmitted messages 11 and receive control commands from base stations 1-4 at the same time.

The above method provides for cyclic polling using base stations 1-4 of all subscribers 5. In this case, repeated polling of subscriber 5 is possible only after all other subscribers 5 have been polled. There may be cases when subscriber 5 shall send a message to base stations 1-4 as quickly as possible, for example, in case of an emergency. Such events are quite rare, but information about them shall be delivered to the customer 7 as quickly as possible. To implement this in the above-described method, all base stations 1-4 (each BS 1, BS 2, BS 3, BS 4) shall be provided (they have) additional reception channels, which are similar for all base stations 1-4 (meanwhile each base station may have either one additional reception channel, or two, or any greater number s of additional reception channels). In this case, any subscriber 5 (or several of any subscribers 5 at once) can transmit (send) an additional message 31 at any time (out of turn within its m group) on any of the s frequencies ($f_{s1}$-$f_{ss}$) of additional reception channels of base stations 1-4 (FIG. 8). Subscriber 5 transmits a preamble (marker) 25, its ID number and a message (FIG. 5). To increase the reliability of the delivery of emergency messages from subscribers 5, it can be duplicated in the usual polling cycle of subscribers 5 by base stations 1-4.

The second option of sending messages 31 by subscriber 5 (subscribers 5) in an emergency is possible. In this case, subscriber 5 (or several subscribers 5) can send a message out of turn for its m group on any of n frequencies (fn-f1n) of reception channels by base stations 1-4 after the end of the transmission of response messages 20 by subscribers 5 of the last subgroup (No. r) of any group m (FIG. 9). In this case, the subscriber 5 transmits a preamble (marker) 25, its ID number and a message (FIG. 5). Preamble (marker) 25 may not be transmitted, because the moment t6 of the ending of the transmission of the last subgroup (No. r) of any m group is time-bound to the request (message 11) of the corresponding base station 1-4 (FIG. 9).

Subscribers 5 (FIG. 10), as a rule, are small-sized devices, including sensor 32, processor 33, transceiver with an antenna 35 and autonomous power element 36 (battery). For such devices, it is necessary to ensure minimum energy consumption. The main consumer of energy is transceiver 34, so it should be turned on only during the transmission or reception of information (messages 11) from base stations 1-4. The polling time by base stations 1-4 of one m group of subscribers 5 is Tc (FIG. 8). The complete polling cycle of all m groups of subscribers 5 will be equal to m·Tc. To ensure minimum energy consumption, subscriber 5 shall be synchronized with polling cycles by base stations 1-4 of m groups of subscribers 5. To implement the energy saving mode of subscribers 5, base stations 1-4 in their data packet 11 shall transmit number 15 of m groups of subscribers 5 in a polling cycle. For the initial synchronization, processor 33 turns transceiver 34 into the reception mode for at least 2Tc. During this time, subscriber 5 receives at least one data packet 11 of the request of base stations 1-4. According to the received data packet, the number of the currently polled m group of subscribers 5 and the total number of m groups of subscribers 5 is determined. Based on this information, processor 33 calculates the necessary times to turn on its transceiver 34 in the receiving or transmitting mode corresponding to its m group of subscribers 5, which is why saving energy consumed by subscribers 5 is achieved.

In order to reduce the dwelling time of transmitter 34 of subscribers 5 on the same frequency, or to avoid unauthorized receipt of information from subscribers 5, subscribers 5 can send a response message 20 with a hopping frequency after the transmission of each symbol, or after the transmission of several message symbols (groups of symbols included in response message 20). In this case, the entire set of p frequencies (in the f31-f3p frequency range) can be used to transmit response message 20. FIG. 11 illustrates a variant of transmission of response messages 20 of a r subgroup of four subscribers 5 (for the case p=4). FIG. 11 shows the transmission (sending) of response messages 20.1.1, 20.1.2, 20.1.3 and 20.1.4 on fab $f_{32}$, $f_{33}$ and $f_{3p}$ frequencies by subscribers of one of r subgroup (for example, subgroup No. 1 of group No. 2 subscribers 5). Subscribers 5 of one r subgroup of subscribers 5 use p of different pseudo-random frequency hopping algorithms, one of p numbers is assigned to each algorithm in accordance with number 28 of subscriber 5 in r subgroup of subscribers 5. All ps of pseudo-random frequency hopping laws for subscribers 5 of one r subgroup of subscribers 5 are selected so as to exclude collisions between subscribers 5 of one r subgroup of subscribers 5, i.e. at any time any frequency from the f31-f3p range can be used only by one subscriber 5 from its r subgroup. The corresponding base station 1-4 for each r subgroup of subscribers 5 uses the associated p of pseudo-random laws (algorithms) of frequency hopping for subscribers 5 of this r subgroup of subscribers 5 to restore messages 20 of subscribers 5, to which its identification number (ID), formed from the m group number of subscriber 5, the r subgroup r number of subscriber 5 and the number of subscriber 5 in the r subgroup.

Thus, the suggested method for wireless communication 10 between subscribers 5 and base stations 1-4, based on the base stations 1-4 information transmission using a CSS or DSSS wide-band modulation, or a UNB narrow-band modulation, and a UNB narrow-band modulation for transmitting information from subscribers 5 allows avoiding collisions between transmitted data packets and increasing the network bandwidth. The suggested method allows managing multiple endpoints of multiple base stations in wireless networks when it is necessary to provide the maximum communication range, as a result of which the network system bandwidth is limited.

The invention claimed is:
1. A wireless communication method between subscribers and base stations, the method comprising:
  dividing the subscribers into subscriber groups having subscriber group numbers, each of which has subgroups, each including one subscriber;
  dividing the base stations into base station groups, and all base stations of all base station groups have the same number of receiving channels of a UNB narrowband modulation, and all base stations of each base station group have data channels with the same time and frequency characteristics;

periodically sending messages to all subscribers using all base stations, which includes the corresponding subscriber group numbers of subscriber groups;

receiving and decoding the messages by the subscribers;

when the subscriber group number of a respective subscriber matches the subscriber group number in a message of the messages the subscriber received, sending by all subscribers of a subscriber group of the subscriber groups having the subscriber group number response messages to base stations using a UNB narrow-band modulation, and sending the response messages sequentially from all subgroups of subscribers of the subscriber group, the subscribers of the subgroup sending the response messages at different frequencies and the base stations receiving the response messages on all frequencies corresponding to the subscribers, decoding the response messages, and forming a response message database, which is used to generate subsequent messages, including the corresponding subscriber group numbers of subscriber groups, and cyclically repeating the periodic sending of the subsequent messages and repeating the reception of the response messages.

2. The method according to claim 1, wherein the periodic sending of messages to all subscribers is performed using a CSS wide-band modulation.

3. The method according to claim 1, wherein the periodic sending of messages to all subscribers is performed using a DSSS wide-band modulation.

4. The method according to claim 1, wherein the periodic sending of the messages to all subscribers is performed using the UNB narrow-band modulation.

5. The method according to claim 4, wherein the periodic sending of the messages to the base stations of each group is performed simultaneously on different frequencies, and all subscribers receive the messages simultaneously on different frequencies.

6. The method according to claim 1, wherein the periodic sending simultaneously of the messages to all subscribers is performed simultaneously from all of the base stations on an identical frequency within each subscriber group and on different frequencies between different subscriber groups.

7. The method according to claim 6, wherein when receiving the messages, each subscriber scans a frequency of the messages sent from the base stations and selects one of the identical and different frequencies with best reception conditions for receiving the messages.

8. The method according to claim 1, wherein the periodic sending sequentially of the messages to all of the subscribers is performed sequentially from all of the groups of the base stations on the an identical frequency.

9. The method according to claim 8, wherein the subscribers send the response messages in each cycle when the messages are sent by all of the base stations.

10. The method according to claim 1, wherein each of the subscribers determines a shift in a frequency relative to that of the base station and corrects the frequency by an amount of the shift when receiving the messages.

11. The method according to claim 1, wherein the subsequent messages of the base stations include information on acknowledgment or non-acknowledgment of receipt by the base stations of the response messages during a previous sending of the messages, while all of the subscribers of each subscriber group forward a subsequent next response messages when the subscribers receive the subsequent messages from the base stations, including information on acknowledgment of receipt provided that the group number in the subsequent messages coincides, and if the subscribers receive the subsequent messages from the base stations, including information on non-acknowledgment of receipt, the subscribers re-send previous response messages sent during the previous sending of the messages.

12. The method according to claim 1, wherein the messages sent to all subscribers also include the subscriber group number of subscriber groups, and each subscriber synchronizes the transmission time of the response message with a receipt time of indicated messages from base stations, taking into account the subscriber group number of subscriber groups.

13. The method according to claim 1, wherein the messages sent to all subscribers also include the subscriber group number of subscriber groups, and each subscriber of each subscriber group calculates the transmission time of subsequent messages for its subscriber group after receiving the subsequent messages and is included in a reception mode only while the base stations transmit the subsequent messages for the subscriber group of subscribers of a respective base station of the base stations in a next cycle, taking into account the subscriber group number of subscriber groups of subscribers.

14. The method according to claim 1, wherein each base station has at least one additional reception channel, and at least one subscriber sends an additional message out of turn within the subscriber group of the at least one subscriber on the frequency of the at least one additional reception channel, wherein the additional message includes a preamble and an ID number.

15. The method according to claim 1, wherein at least one subscriber sends an additional message to any of the frequencies of the channels for receiving a UNB narrow-band modulation after all subscribers of the subscriber group of the at least one subscriber finish sending a response message, and wherein the additional message includes a preamble and an ID number.

16. The method according to claim 1, wherein the subscribers send a response message with a frequency hopping after transmission of each symbol or each group of symbols included in the response message transmitting it each symbol or each group of symbols by means of a set of frequencies corresponding to the subscribers.

17. The method according to claim 16, wherein the base stations for each subgroup of subscribers use associated pseudo-random frequency hopping algorithms for subscribers of each subgroup.

18. The method according to claim 1, wherein the base stations use a server to send the messages periodically and generate a database of the response messages.

19. The method according to claim 18, wherein the database of the response messages is transmitted via at least one communication channel to at least one information user.

* * * * *